United States Patent [19]

Ueyama et al.

[11] Patent Number: 5,060,162

[45] Date of Patent: Oct. 22, 1991

[54] VEHICLE IN-SITU LOCATING APPARATUS

[75] Inventors: Yoshiki Ueyama, Neyagawa; Nobuhiko Yasui, Hirakata, both of Japan

[73] Assignee: Matsushita Electric Industrial Co., Ltd., Osaka, Japan

[21] Appl. No.: 446,123

[22] Filed: Dec. 5, 1989

[30] Foreign Application Priority Data

Dec. 9, 1988 [JP] Japan ............................... 63-312236
May 24, 1989 [JP] Japan ................................. 1-130819

[51] Int. Cl.$^5$ ............................................. G06F 15/50
[52] U.S. Cl. .................................. 364/449; 364/454; 340/988; 340/990
[58] Field of Search ............... 364/443, 444, 449, 453, 364/454, 457; 73/178 R; 340/988, 990, 995; 33/356, 357

[56] References Cited

U.S. PATENT DOCUMENTS

| | | | |
|---|---|---|---|
| 4,470,119 | 9/1984 | Hasebe et al. | 364/449 |
| 4,688,176 | 8/1987 | Hirata | 364/449 |
| 4,796,191 | 1/1989 | Honey et al. | 364/449 |
| 4,807,127 | 2/1989 | Tenmoku et al. | 340/988 |
| 4,862,398 | 8/1989 | Shimizu et al. | 364/457 |
| 4,879,658 | 11/1989 | Takashima et al. | 340/988 |
| 4,887,081 | 12/1989 | Iihoshi et al. | 340/988 |
| 4,924,402 | 5/1990 | Ando et al. | 364/454 |

FOREIGN PATENT DOCUMENTS 62-144016 6/1987 Japan .

Primary Examiner—Gary Chin
Attorney, Agent, or Firm—Stevens, Davis, Miller & Mosher

[57] ABSTRACT

The apparatus includes a running distance sensor, a heading direction sensor based on terrestrial magnetism, and a map data base for identifying the road on which the vehicle is running. In implementing map matching for collating running data with map data, the difference between the heading direction and the road direction on the map is calculated so that it is underestimated on the basis of the angle with respect to magnetic north for specific sections memorized as map data or for all sections. The probability of erroneous matching is lowered and the vehicle is located accurately even in such places as bridges, elevated roadways, tunnels and slopes where the terrestrial magnetic azimuth deviates.

12 Claims, 4 Drawing Sheets

VEHICLE IN-SITU LOCATING APPARATUS

BACKGROUND OF THE INVENTION

1. Field of the Invention

This invention relates to a vehicle in-situ locating apparatus useful for locating a vehicle such as an automobile which runs mainly on roads or a self-propelling vehicle which runs mainly on a predetermined course.

2. Description of the Prior Art

A method of finding the current location of a running vehicle by the vehicle's driver uses a distance sensor and an azimuth sensor to determine the vehicle's location in terms of relative position with respect to the position of departure. The azimuth sensor used generally is a terrestrial magnetism sensor which is advantageous because it is capable of finding the absolute azimuth and it is inexpensive. However, use of any sensor suffers a progressively falling accuracy due to the cumulative error of the sensor. On this account, the development of map matching is under way, by which the position data collected during the run is compared with the map data and the inferred vehicle location is modified thereby to nullify the cumulative error. However, when a vehicle equipped with a location apparatus based on the terrestrial magnetism sensor runs on such road section as a steel bridge, elevated roadway, tunnel or slope, where the terrestrial magnetic azimuth deviates, an erroneous map matching takes place, which deteriorates the accuracy of location. As a method of preventing this, a technique is used of detecting magnetized or terrestrial magnetism variation areas using a digital map, as proposed in Japanese Patent Unexamined Publication (JP-A) No. 62-144016. FIG. 5 shows the system configuration of this method. A right wheel 501 and a left wheel 502 have a right wheel sensor 503 and left wheel sensor 504, respectively, and their outputs are passed to a processor 506, which also receives the output of a terrestrial magnetism sensor 505. The processor performs map matching for the map data read out of a digital map memory 507. Recorded on the digital map are identifiers of terrestrial magnetism variation areas, and if the inferred location calculated by the processor 506 is within such area, the azimuth output provided by the terrestrial magnetism sensor is determined to be unreliable and the heading direction is calculated by using only the wheel sensors that serve as an angle sensor.

Another conventional technique is a method and apparatus for vehicle navigation, as proposed in U.S. Pat. No. 4,796,191 or Japanese Patent Unexamined Publication (JP-A) No. 61-56910. This technique is based on the fact that the region where the vehicle is possibly situated extends on a two-dimensional ma due to the sensor's cumulative error, and it deals with a profile of equal probability on a two-dimensional plane having equal probability of the presence of the vehicle, and, if the equal probability profile crosses the center line of a road on the two-dimensional map, it judges that the vehicle is possibly running on that road. Thereafter, the system further implements the judgement for the continuity of the road and the collation of the running distance vs. heading direction graph with the distance vs. road direction graph and, if a collation with high coincidence results, moves the inferred location to that road. The system uses two kinds of azimuth sensors, and infers the sensor error from the degree of coincidence between the sensors thereby to determine the equal probability profile.

Among the foregoing conventional techniques, the former system necessitates an angular sensor for the relief of the terrestrial magnetism sensor in a terrestrial magnetism variation area imparted by the map data, and it involves a problem of considerable azimuth deviation if the terrestrial magnetism variation area extends longer and the heading of the vehicle varies progressively while the azimuth sensor is replaced with the angular sensor. The latter system is devised to cope with the above situation without the need of memorizing terrestrial magnetism variation areas as ma data. The main cause of growing azimuth error in using a terrestrial magnetism sensor for the azimuth sensor is the distortion of terrestrial magnetic field when the vehicle is running on a steel bridge, elevated roadway or tunnel. This conventional system uses a pair of wheel sensors and a yaw rate sensor in unison with the terrestrial magnetism sensor so as to correct the anticipated value of azimuth sensor error on the basis of the degree of inconsistency among these sensors. Therefore the system needs two kinds of azimuth sensors, and even with these sensors the anticipated error can be inaccurate. Namely, in case of combining a terrestrial magnetism sensor and a pair of wheel sensors, the wheel sensors have a growing error relative to the distance, resulting in a relatively large detection error. Experience has revealed that when a vehicle was running in a road section which was gradually converted to an elevated roadway, the inconsistency of detected azimuth from the result of the terrestrial magnetism sensor was underestimated even in the locality of distorted terrestrial magnetism, and the system failed to find a road in the expected azimuth and located the vehicle in a parking place instead of a road. In the case of combining a terrestrial magnetism sensor and a yaw rate sensor which developed a growing error with time, the degree of inconsistence of the detected azimuth with the terrestrial magnetism sensor was not estimated properly when the vehicle was running slowly due to a traffic jam or the like on an elevated roadway or in a tunnel even though the zero-point adjustment was conducted at stops of the vehicle, and the system underestimated the error of terrestrial magnetism sensor during a run in a distorted terrestrial magnetism area, failing in the map matching and then resulting in a degraded locating accuracy. Accordingly, problems to be solved include the need of another sensor besides the terrestrial magnetism sensor for constituting a complete azimuth sensor, and, even in this case, the failure of map matching when the vehicle is running on an elevated roadway or in a tunnel where the distortion of terrestrial magnetism is most pronounced, which results in a degraded locating accuracy.

SUMMARY OF THE INVENTION

An object of this invention is to locate a vehicle accurately by using a distance sensor, terrestrial magnetism sensor, map data, and the map matching technique, even in such road sections as steel bridges, elevated roadways, tunnels and slopes where the terrestrial magnetism deviates.

In order to achieve the above objective, the inventive apparatus, which comprises a running distance sensor, a terrestrial magnetic azimuth sensor, a map memory means, an inferred location calculation means, a magnetic north memory means, a modification value calculation means, an azimuth difference calculation means, and a map matching means, is designed to evaluate the difference between the road direction and heading direction through the modification in response to the angle between the magnetic north and road direction based on the formula or conversion table, and use the result for map matching by underestimating the azimuth difference.

According to this invention, the vehicle location is inferred through the accumulation operation by the inferred location calculation means for the running distance measured by the running distance measuring means and the heading direction detected by the heading direction detection means including the terrestrial magnetism sensor. In calculating the azimuth difference with respect to the heading direction by the azimuth difference calculation means based on data of road direction read out of the map memory means, modification is made on the basis of the angle from the magnetic north in response to road section identifiers of the road or in all road sections. The azimuth difference is used in matching the inferred location provided by the inferred location calculation means with the road data stored in the map memory means by the map matching means, and this enables accurate location of the vehicle even during a run in such terrestrial magnetism variation areas as elevated roadways, steel bridges, tunnels and slopes without the additional need of other angular sensors, and also enables accurate location of the vehicle without a significant deviation of direction even if the terrestrial magnetism variation area extends longer.

In comparing the heading direction with the road direction for map matching, the presence or absence of constructions made of ferromagnetic material and slopes along the road is examined in accordance with road section identifiers in the map data thereby to underestimate the azimuth difference using the formula or conversion table based on experience, whereby an outstanding vehicle location apparatus capable of accurately locating the vehicle, even during a run on such road sections as elevated roadways, steel bridges, tunnels and slopes, is accomplished without adding an angular sensor. Since the need of modification for the azimuth difference is minimal, it is possible to accomplish a vehicle location apparatus which is as nearly superior as the above-mentioned one without memorizing such special map data as road section identifiers.

DESCRIPTION OF THE PREFERRED EMBODIMENTS

Figure 1:
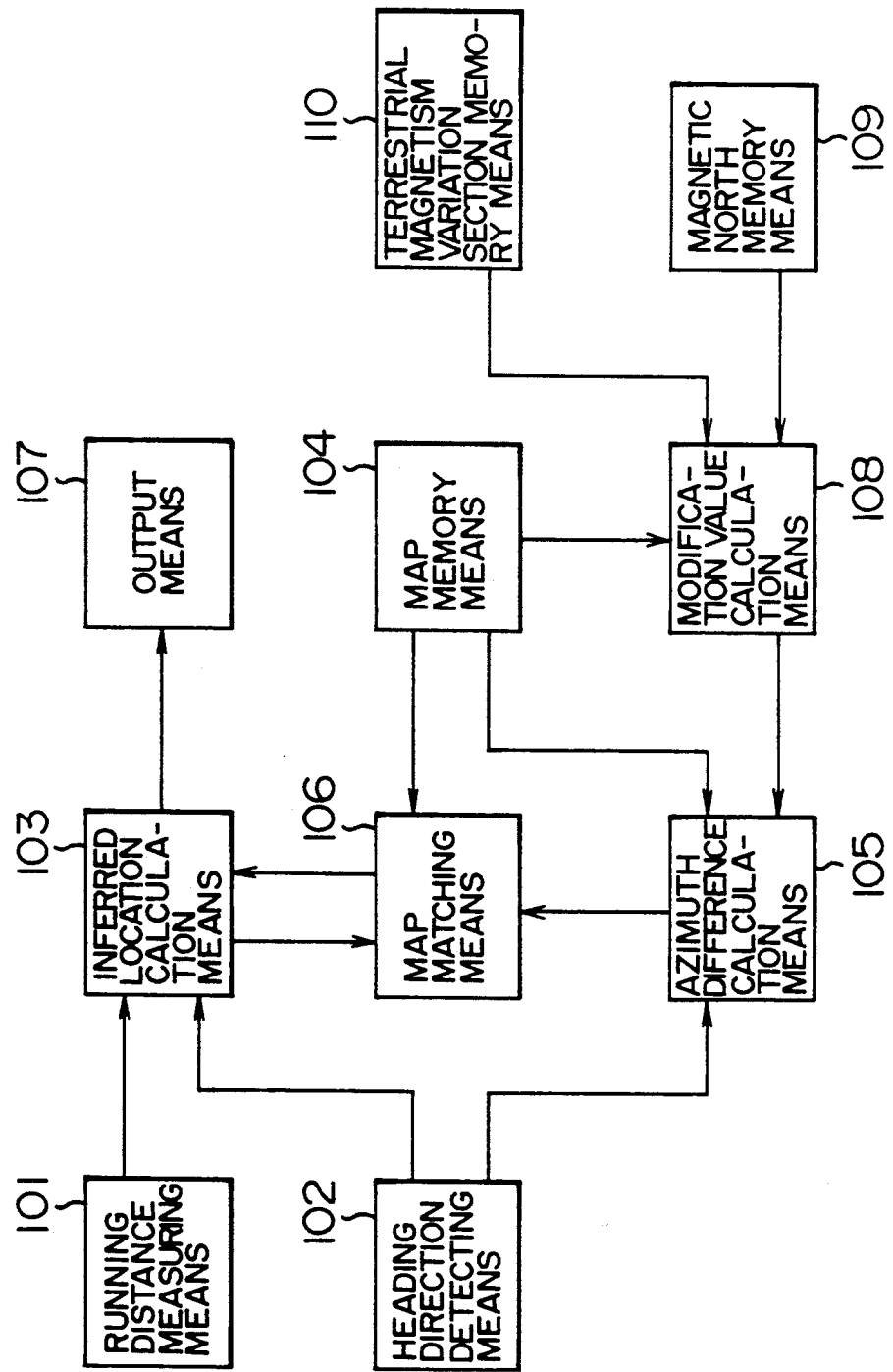
FIG. 1 is a block diagram showing the vehicle location apparatus embodying the present invention.

FIG. 1 is a block diagram of an embodiment of this invention. Indicated by 101 is a running distance measuring means, and it measures the running distance of the vehicle by counting the number of revolutions of a wheel. 102 is a heading direction detecting means, and it detects the heading direction of the vehicle using a terrestrial magnetism sensor. 103 is an inferred location calculation means, and it implements the calculation for advancing the vehicle's previous inferred location by the amount of a running distance measured by the running distance measuring means 101 in a direction detected by the heading direction detection means 102 thereby to determine a new inferred location of the vehicle. 104 is a map memory means, and it stores road data including coordinates and directions of lines that approximate roads. 109 is a magnetic north memory means, and it stores the angle of magnetic north with respect to true north. In case the angular difference between true north and magnetic north is small, true north may be treated as magnetic north practically, with the magnetic north memory means being omitted. 110 is a terrestrial magnetism variation section memory means, and it has a record of such sections as steel bridges, elevated roadways, tunnels and slopes where the terrestrial magnetism deviates due to the distortion of magnetic field. The data of magnetic north and terrestrial magnetism variation sections may be stored as part of map data in the map memory means. 108 is a modification value calculation means, and it uses the magnetic north data read out of the magnetic north memory means to calculate the allowable value of the deviation of terrestrial magnetic azimuth as a modification value for road directions of terrestrial magnetism variation sections among roads read out of the map memory means. 105 is an azimuth difference calculation means, and it calculates the difference between the previous heading direction detected by the heading direction detecting means and the road direction read out of the map memory means by implementing the modification in accordance with the modification value provided by the modification value calculation means. 106 is a map matching means, and it judges as to whether the trace of previous inferred locations can be matched with the map on the basis of the azimuth difference and, if possible, implements the map matching by correcting the inferred location provided by the inferred location calculation means. 107 is an output means, and it delivers the resulting inferred location of the vehicle. The output means may be a display unit which simply displays the inferred location, or may be a display unit which displays the inferred location on the map. Alternatively, the output means may be a communication unit for sending the inferred location data, or it may be an audio output unit. The components 103, 105, 106 and 108 may be integrated by use of a microprocessor or the like.

The terrestrial magnetism variation section memory means 110 may be a ferromagnetic body section memory means which indicates the presence of constructions made of such ferromagnetic material as iron along such road sections as steel bridges, elevated roadways and tunnels, or it may be a sloping section memory means which indicates the gradients of roads. Alternatively, the azimuth difference may be calculated invariably through the calculation of modification value on the basis of the inference of a ferromagnetic body section or sloping section, instead of having such a terrestrial magnetism variation area memory means a 110.

Figure 2:
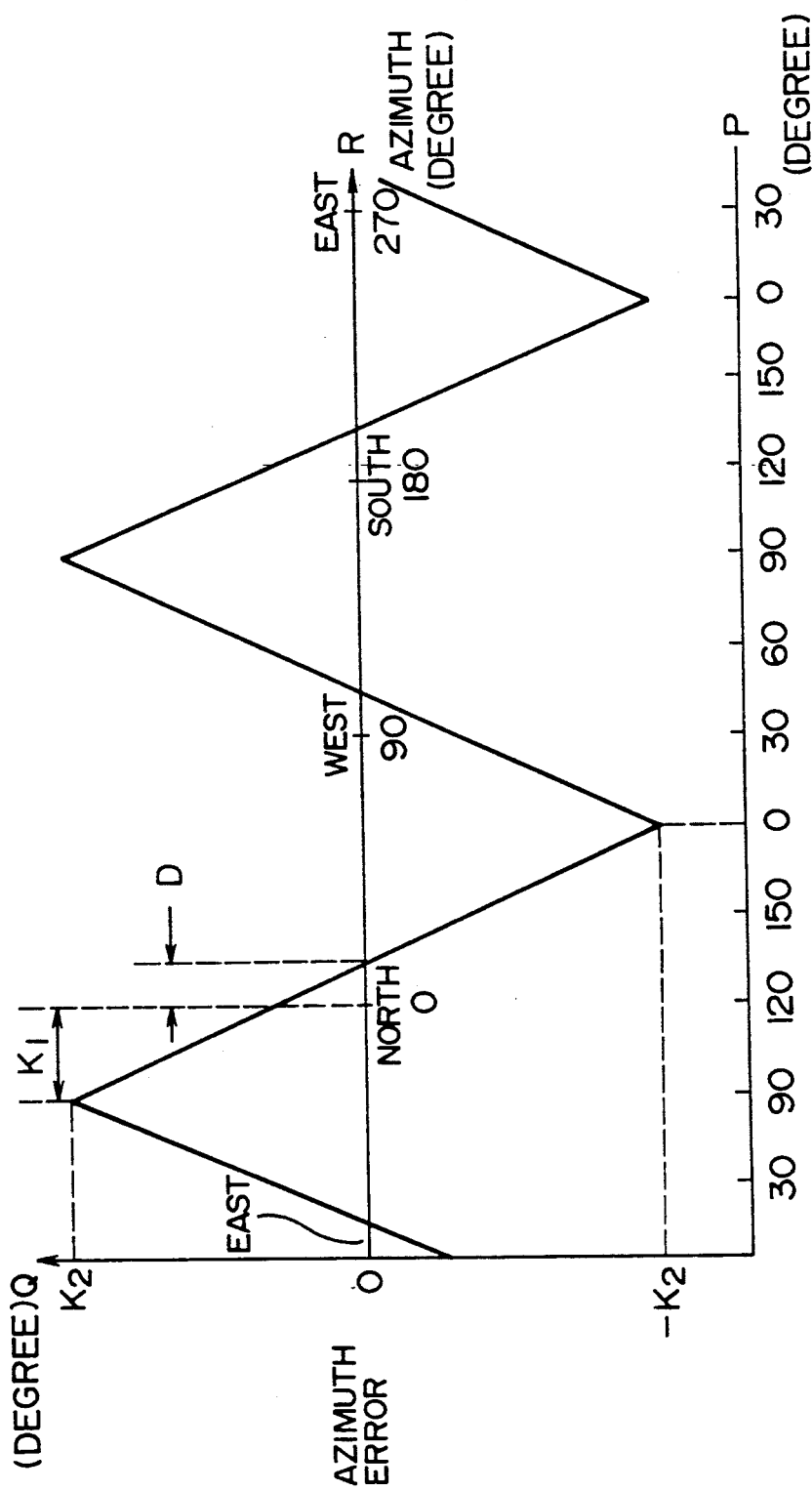
FIGS. 2 and 3 are diagrams used to explain the operation of the embodiment.
Figure 3:
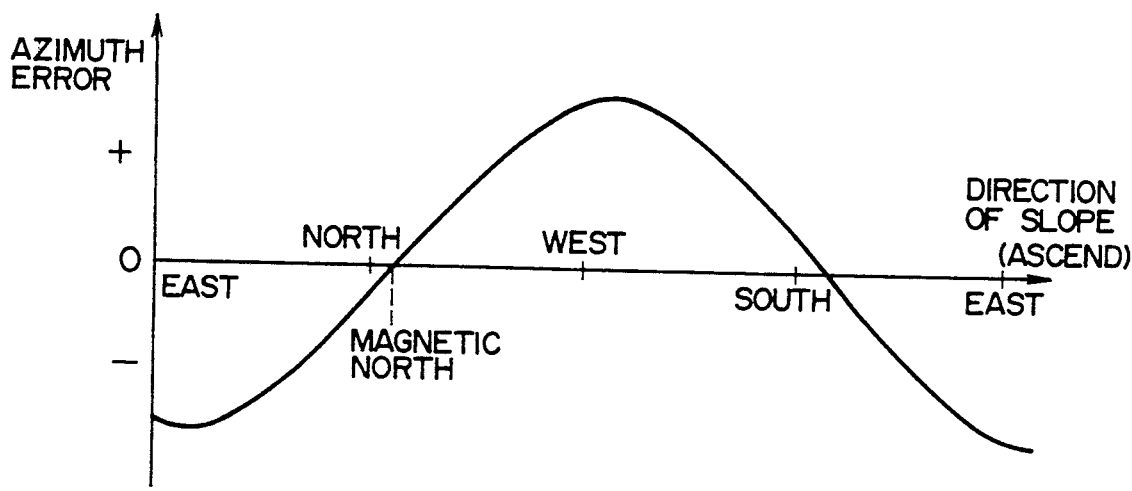
Figure 5:
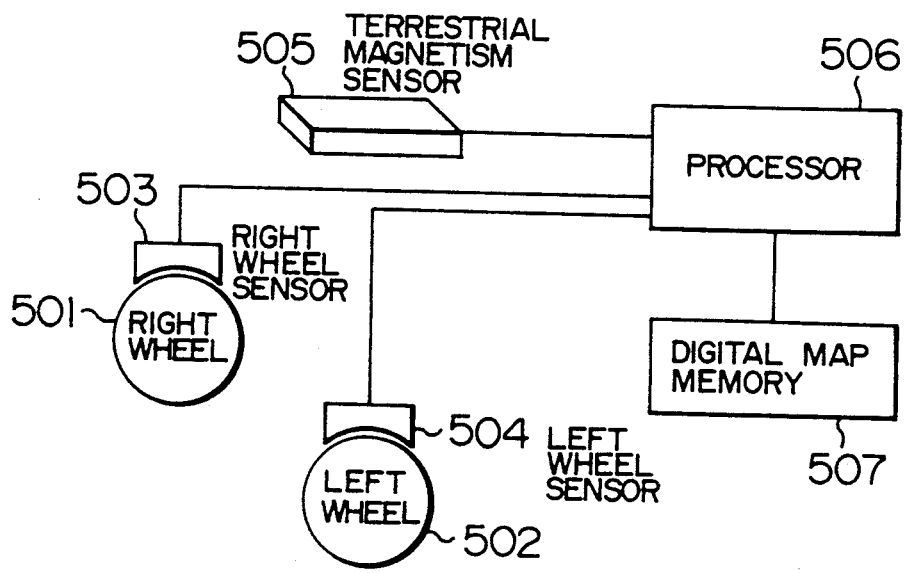
FIG. 5 is a block diagram showing the conventional system arrangement.

FIGS. 2 and 3 are diagrams used to explain the present invention. Azimuth detection based on the terrestrial magnetism sensor incurs error most frequently due to constructions made of ferromagnetic material (generally iron) existing along the road, such as an elevated roadway, steel bridge and tunnel. The terrestrial magnetism sensor equipped on a vehicle also develops a deviation of detected azimuth due to the slope of the road.

A first cause of the terrestrial magnetism variation is the presence of constructions of iron along the road. There is regularity in the distortion of terrestrial magnetism, and according to experiment, it has a trend as shown in FIG. 2, in which the horizontal axis represents the azimuth of a road where iron constructions exist and the vertical axis represents the error of detected azimuth. The figure reveals such detection error as that a road closely pointing magnetic north is detected to point nearer the magnetic north, and a road closely pointing magnetic south is detected to point nearer magnetic south. Accordingly, by memorizing that the road sections concerned are ferromagnetic body sections in the ferromagnetic body section memory, it is possible to eliminate the dropout of judgement for the azimuth difference by evaluating the difference between the heading direction and road direction on condition that there exist iron constructions. Namely, in calculating the difference between the heading direction and road direction with the terrestrial magnetism sensor, if the azimuth difference is zero then it is treated as zero. On the other hand, in the presence of an azimuth difference, if it is within the range of error depending on the angle with magnetic north shown in the graph of FIG. 2, the azimuth difference is regarded to be zero, or if it is outside the range, the excessive angle is regarded to be the azimuth difference. The graph of FIG. 3 may be formed in a conversion table, or it may be expressed in a formula. In the latter case, the azimuth difference modified by the angle between the road direction or heading direction and magnetic north is calculated as follows For a heading direction of M detected by the terrestrial magnetism sensor and a road direction of R, the azimuth difference A is calculated as follows.

$$P = (R - D - K1 + 360) \bmod 180$$
$$Q = \min(P \cdot K2/(90 - K1) - K2, K2)$$
$$+ \min(K2 \cdot (180 - K1 - P)/K1, K2) - K2$$
$$B = \mathrm{dif}(M, R)$$

(Case 1) For $\mathrm{sign}(B) \cdot \mathrm{sign}(Q) \geq 0$
$\quad A = \max(\mathrm{abs}(B) - \mathrm{abs}(Q), 0) \cdot \mathrm{sign}(B)$
(Case 2) For $\mathrm{sign}(B) \cdot \mathrm{sign}(Q) < 0$
$\quad A = B$ The azimuth is measured in degrees counterclockwise from the north, with the declination, i.e., a differential angle of magnetic north from true north, being D. The heading direction M provided by the terrestrial magnetism sensor is assumed to be rendered a simple modification by offsetting the declination component. K1 and K2 have values based on experiment as shown in FIG. 2. Dif(A, B) denotes an angular difference (signed) between A and B. Sign(A) is a function taking 1 when A is positive, −1 when it is negative, or 0 when it is zero. Abs(A) denotes the absolute value of A.

In this manner, the azimuth difference modified by the angle from magnetic north is calculated. Although the case where ferromagnetic body section identifies are memorized has been described, this technique has effectiveness even without the provision of such special map data. In this case, the azimuth difference is calculated on assumption that all road sections are ferromagnetic body sections. The range of modification, which varies depending on the road direction, is ±20° at most, and the probability of the existence of roads having such awkward angular difference is low, allowing the technique to have its full effectiveness. Even in the presence of a situation as encountered on a ramp of a highway, the heading direction varies soon, and it can be treated by holding the map matching or implementing concurrent processings of map matching and comparison for multiple candidates of road.

A second cause of terrestrial magnetism variation is the slope of the road. In this case, due to the inclination of terrestrial magnetic vector, the variation of terrestrial magnetism differs depending on the direction of slope of a road. FIG. 3 shows the relationship between the direction of slope and azimuth error (counterclockwise) for the case of a constant slope. When the information provided by the slope section memory means has revealed that the road section read out of the map memory means is a slope section, a possible variation angle of terrestrial magnetic azimuth is calculated from the direction of the ascending or descending slope. As in the preceding case of terrestrial magnetism variation cause, if the difference between the road direction and terrestrial magnetic azimuth is within the calculated angle, the azimuth error is treated as zero, or if it is outside the range, a modified azimuth difference is calculated by the angle from magnetic north, with the excessive angle being set as an azimuth error. In case the angle of slope is known quantitatively, more accurate modification is possible, while even the ascendance or descendance of slope is unknown, it is sufficient to calculate the angle by underestimating the azimuth difference in consideration of both polarities of gradient. The modification value of this case, which varies depending on the road direction, is plus or minus several degrees at most, and it is effective enough and is virtually small enough to be free from a misjudgement of road.

Figure 4:
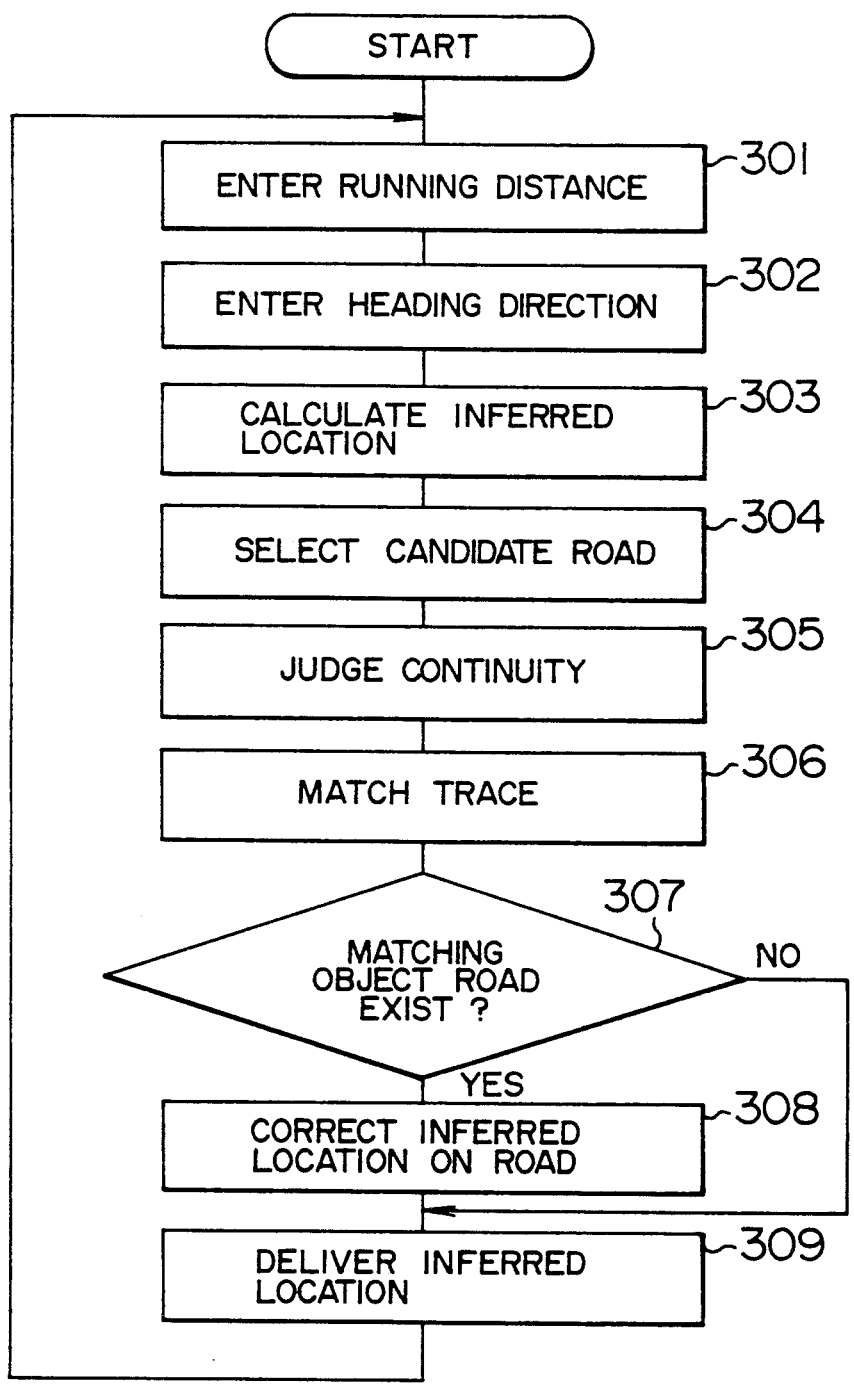
FIG. 4 is a flowchart showing in brief the processing of the embodiment.

FIG. 4 is a brief flowchart showing an embodiment of this invention. The process of map matching may rely on the conventional method such as the one proposed as an apparatus and method of vehicle navigation in U.S. Pat. No. 4,796,191 or Japanese Patent Unexamined Publication (JP-A) No. 61-56910. The map matching process includes the calculation of the difference between the heading direction and road direction, and in this case the modification by the angle from magnetic north is conducted against the above-mentioned first or second terrestrial magnetism variation cause for the road which is being examined whether it is the place where the vehicle is running. This modification may be conducted on the basis of the information provided by the terrestrial magnetism variation section memory means, ferromagnetic body section memory means, or sloping section memory means, or alteratively it may be conducted at all times. The following describes this method in brief.

Step 401 enters the running distance provided by the running distance sensor, and step 402 enters the heading direction provided by the terrestrial magnetism sensor or the like. Step 403 implements the inferred location calculation in which the position moved from the previous inferred location by the value of the running distance is calculated to determine a new inferred location. Step 404 evaluates the difference between the heading direction and road direction through the modification based on the magnetic north described above, and selects a candidate road for matching. Step 405 implements the judgment of continuity to test whether the candidate road connects with the previously matched road. Step 406 collates the running distance vs. heading direction graph with the distance vs. road direction graph and, if the collation reveals high coincidence, selects the road as the object of matching. The calculation of coincidence also includes the modification based on magnetic north described above. Only if decision step 407 reveals the presence of an object road for matching, step 408 moves the inferred location onto the matching object road. Finally, step 409 delivers the inferred location, and the sequence returns to step 401. In case of low coincidence, the matching process is suspended based on the judgment that the vehicle is running in a place other than a road, such as a parking place. Experience has revealed a high probability of failing this judgment when the azimuth difference was great due to a distorted terrestrial magnetism or the like. However, by conducting the modification based on the angle from magnetic north against the first or second terrestrial magnetism variation cause described previously, the probability of erroneous judgment is lowered and the vehicle can be located accurately.

Although in the foregoing embodiment the modification calculation based on magnetic north is carried out for the road direction read out of the map memory means, the difference between the heading direction and road direction, which is the item of interest, may be evaluated by implementing the calculation of modification value for the heading direction provided by the terrestrial magnetism sensor, and completely the same effectiveness is accomplished.

We claim:

1. A vehicle locating apparatus comprising:
    running distance measuring means for measuring a running distance of a vehicle;
    heading direction detecting means including at least one terrestrial magnetism sensor, for detecting a heading direction of the vehicle;
    inferred location calculation means for calculating a relative movement value of the vehicle from the heading direction detected by said heading direction detection means and the running distance measured by said running distance measuring means, and for calculating renewing coordinates of an inferred location of the vehicle by adding the relative movement value to coordinates of a previous inferred location;
    map memory means for storing road data;
    azimuth difference calculation means for calculating an angle as the calculated azimuth difference by subtracting a modification value as an upper limit value from an azimuth difference which is determined by an angle of said road direction or said heading direction and magnetic north;
    map matching calculation means for judging, based on the calculated azimuth difference, road data stored in said map memory means and data of the inferred vehicle location provided by said inferred location calculation means, whether the vehicle is running on a road on the map, for calculating, when it is judged that the vehicle is running on the road, a position of the vehicle which is running on the road from said road data and for correcting the inferred location calculated by said inferred location calculation means based on the calculated vehicle position; and
    output means for outputting the corrected inferred location.

2. A vehicle locating apparatus according to claim 1, wherein said map memory means stores said road data and section identifiers representing features of arbitrary sections of the road.

3. A vehicle locating apparatus according to claim 1, wherein said azimuth difference calculation means evaluates said modification value in accordance with a predetermined calculation formula which is a function of the angle between the road direction or heading direction and magnetic north or north.

4. A vehicle location apparatus according to claim 2, wherein said azimuth difference calculation means evaluates said modification value in accordance with a predetermined calculation formula which is a function of the angle between the road direction or heading direction and magnetic north or north.

5. A vehicle locating apparatus according to claim 1, wherein said azimuth difference calculation means evaluates said modification value in accordance with a predetermined conversion table addressed by the angle between the road direction or heading direction and magnetic north or north.

6. A vehicle locating apparatus according to claim 2, wherein said azimuth difference calculation means evaluates said modification value in accordance with a predetermined conversion table addressed by the angle between the road direction or heading direction and the magnetic north or north.

7. A vehicle locating apparatus according to claim 2, wherein said section identifiers indicate the presence or absence of ferromagnetic bodies along roads, and wherein said azimuth difference calculation means evaluates said modification value in accordance with a formula or conversion table on the basis of (i) the angle between the road direction or heading direction and magnetic north and (ii) the presence or absence of the ferromagnetic body.

8. A vehicle locating apparatus according to claim 2, wherein said section identifiers indicate gradients of roads, and wherein said azimuth difference calculation means evaluates said modification value in accordance with a formula or conversion table on the basis of (i) the angle between the road direction or heading direction and magnetic north and (ii) the gradient of the road.

9. A vehicle locating apparatus comprising:
    running distance measuring means for measuring a running distance of a vehicle;
    heading direction detecting means including at least one terrestrial magnetism sensor, for detecting a heading direction of the vehicle;
    inferred location calculation means for calculating a relative movement value of the vehicle from the heading direction detected by said heading direction detection means and the running distance measured by said running distance measuring means, and for determining the coordinates of an inferred location of the vehicle by adding the relative movement value to coordinates of a previous inferred location;
    map memory means for storing road data;
    magnetic north memory means for storing an angle between the north and magnetic north;
    terrestrial magnetism variation section memory means for storing states of roads;
    modification value calculation means for calculating a modification value for a road direction provided by said map memory means in response to an output of said terrestrial magnetism variation section memory means and an output of said magnetic north memory means;
    azimuth difference calculation means for calculating an angle as the calculated azimuth difference by subtracting said modification value as an upper limit value from an azimuth difference between the road direction stored in said map memory means and the heading direction detected by said heading direction detecting means;

map matching calculation means for judging based on the calculated azimuth difference, the road data stored in said map memory means and data of the inferred vehicle location provided by said inferred location calculation means, whether the vehicle is running on a road on the map, for calculating when it is judged that the vehicle is running on a road on the map, a position of the vehicle which is running on the road from said road data and for correcting the inferred location calculated by said inferred location calculation means based on the calculated vehicle position; and output means for outputting the corrected inferred location.

10. A vehicle locating apparatus comprising:

running distance measuring means for measuring a running distance of a vehicle;

heading direction detecting means including at least one terrestrial magnetism sensor, for detecting a heading direction of the vehicle;

inferred location calculation means for calculating a relative movement value of the vehicle from the heading direction detected by said heading direction detection means and the running distance measured by said running distance measuring means, and for determining the coordinates of an inferred location of the vehicle by adding the relative movement value to coordinates of a previous inferred location;

map memory means for storing road data;

magnetic north memory means for storing an angle between the north and magnetic north;

terrestrial magnetism variation section memory means for storing states of roads;

modification value calculation means for calculating a modification value for a road direction provided by said heading direction detecting means in response to an output of said terrestrial magnetism variation section memory means and an output of said magnetic north memory means;

azimuth difference calculation means for calculating an angle as the calculated azimuth difference by subtracting said modification value as an upper limit value from an azimuth difference between the road direction stored in said map memory means and the heading direction detected by said heading direction detecting means;

map matching calculation means for judging based on the calculated azimuth difference, the road data stored in said map memory means and data of the inferred vehicle location provided by said inferred location calculation means, whether the vehicle is running on a road on the map, for calculating when it is judged that the vehicle is running on a road on the map, a position of the vehicle which is running on the road from said road data and for correcting the inferred location calculated by said inferred location calculation means based on the calculated vehicle position; and output means for outputting the corrected inferred location.

11. A vehicle apparatus according to claim 9, wherein the terrestrial magnetism variation stored in said terrestrial magnetism variation section memory is attributable to the presence or absence of ferromagnetic bodies along the roads, or gradients of the roads.

12. A vehicle locating apparatus according to claim 10, wherein the terrestrial magnetism variation stored in said terrestrial magnetism variation section memory is attributable to the presence or absence of ferromagnetic bodies along the roads, or gradients of the roads.

* * * * *